(12) United States Patent
Shintani (10) Patent No.: US 7,012,647 B2
(45) Date of Patent: Mar. 14, 2006

(54) CAMERA HAVING A REFRACTIVE OPTICAL SYSTEM WITH AN INCLINED SURFACE FOLDING AN AXIS OF ENTERED OBJECT LIGHT

(75) Inventor: Dai Shintani, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 581 days.

(21) Appl. No.: 10/101,956

(22) Filed: Mar. 21, 2002

(65) Prior Publication Data

US 2002/0136549 A1  Sep. 26, 2002

(30) Foreign Application Priority Data

Mar. 26, 2001  (JP) ............................. 2001-087447

(51) Int. Cl.
*H04N 5/225* (2006.01)
(52) U.S. Cl. ........................ 348/374; 348/335; 348/341
(58) Field of Classification Search ................ 348/374, 348/375, 335, 340, 341, 333.08, 333.09, 348/345, 373, 369, 357; 396/378, 379, 382, 396/384, 385, 448, 439, 447
See application file for complete search history.

(56) References Cited

U.S. PATENT DOCUMENTS

| | | | |
|---|---|---|---|
| 5,694,628 A * | 12/1997 | Nishitani | 396/379 |
| 6,330,400 B1 * | 12/2001 | Bittner et al. | 396/72 |
| 6,334,718 B1 * | 1/2002 | Akiba et al. | 396/448 |
| 6,339,508 B1 * | 1/2002 | Nozawa et al. | 359/686 |
| 6,549,237 B1 | 4/2003 | Inuma et al. | |
| 6,683,651 B1 * | 1/2004 | Motta et al. | 348/345 |
| 6,734,913 B1 * | 5/2004 | Motta | 348/362 |
| 6,809,772 B1 * | 10/2004 | Motta et al. | 348/341 |
| 6,829,011 B1 * | 12/2004 | Higuchi et al. | 348/340 |
| 6,850,279 B1 * | 2/2005 | Scherling | 348/335 |

FOREIGN PATENT DOCUMENTS

| | | |
|---|---|---|
| JP | 8-181641 A | 7/1996 |
| JP | 9-211287 A | 8/1997 |
| JP | 10-191125 A | 7/1998 |
| JP | 11-220646 | 8/1999 |
| JP | 2000-10165 | 1/2000 |

\* cited by examiner

*Primary Examiner*—Ngoc-Yen Vu
*Assistant Examiner*—Justin Misleh
(74) *Attorney, Agent, or Firm*—McDermott Will & Emery LLP (57) ABSTRACT

A camera provided with a body having an opening for object light to enter, a photographic optical system having an inclined surface for refracting object light entering from the opening to form an image of the object light, and an image sensing element for sensing the object image formed by the photographic optical system, wherein the photographic optical system is disposed within the body so as to form a space between the body and a reflective surface of the inclined surface relative to the object light entering from the opening, and some of the structural parts of the camera are arranged adjacent to the inclined surface in the space.

11 Claims, 10 Drawing Sheets

CAMERA HAVING A REFRACTIVE OPTICAL SYSTEM WITH AN INCLINED SURFACE FOLDING AN AXIS OF ENTERED OBJECT LIGHT

This application is based on Patent Application No. 2001-87447 filed in Japan, the content of which is hereby incorporated by reference.

BACKGROUND OF THE INVENTION

1. Field of the Invention

The present invention relates to a camera, and specifically relates to a digital camera provided with a refractive optical system including a refraction element such as a mirror in a photographic optical system.

2. Description of the Related Art

Since the film used in silver halide cameras cannot be used in digital cameras which electronically record image signals converted by an image sensing element, the film magazine, spool compartment, and film feeding mechanism are unnecessary, thereby increasing the freedom of layout of the image sensing optical system. Furthermore, digital cameras have been proposed, which are provided with a refractive optical system having a refraction means such as a mirror or the like within the optical system, and an image sensing element is disposed on the focusing surface of the optical system, so as to decrease the thickness of the digital camera in the front-to-back direction.

For example, Japanese Laid-Open Patent Application No. 2000-10165 discloses an electronic camera provided with a refractive optical system arranged in a notched part of an electric circuit board disposed at the center inside a flat-shaped body and further arranged parallel to the front surface of the body, and provided with a battery compartment arranged in a perpendicular direction at a side of the refractive optical system.

Japanese Laid-Open Patent Application No. H11-220646 discloses an electronic camera provided with a refractive optical system. A strobe printed circuit board is disposed behind a mirror included in the refractive optical system. This circuit board is larger than the mirror, and is simply positioned behind the mirror, as shown in FIG. 4 of the disclosure.

In recent years compact cameras have been viewed as important, and the efficient arrangement of the structural parts of the camera has become an issue, however, since the cameras disclosed in the above publications provide the refractive optical system in the center of a body and other structural parts are overlaid on the refractive optical system in the thickness direction of the body, the structural parts of the cameras cannot be arranged efficiently, and the cameras are large in size.

SUMMARY

A problem of the art which the present invention aims to solve is arranging the structural parts of the camera more efficiently to provide a compact camera using a refractive optical system.

The present invention solves the aforesaid problem of the art by providing a camera having the structure described below.

A camera provided with a body having an opening for object light to enter, a photographic optical system having an inclined surface for refracting object light entering from the opening to form an image of the object light, and an image sensing element for sensing the object image formed by the photographic optical system, wherein the photographic optical system is disposed within the body so as to form a space between the body and a reflective surface of the inclined surface relative to the object light entering from the opening, and some of the structural parts of the camera are arranged adjacent to the inclined surface of the optical refraction means in the space.

In this structure, the photographic optical system is provided with an inclined surface arranged at an inclination of specific angle relative to the optical axis of the entering light to refract the optical axis of the object light entering the photographic optical system. Accordingly, the photographic optical system can be shaped so as to have a notch at the back surface of the inclined surface, such that when, for example, the photographic optical system is disposed in a perpendicular or horizontal direction, a space is formed which is circumscribed by the back wall of the body and along the back surface of the inclined surface and is housed within the body. Some of the structural parts of the camera may be arranged adjacently in the space formed at the back surface of the photographic optical system.

According to this structure, space is used efficiently because structural parts can be arranged adjacent to the inclined surface of the photographic optical system, thereby allowing the structural parts of the camera to be arranged efficiently such that the camera can be made more compact in form.

It is desirable that the camera has a lens protecting means which can operate to protect the photographic optical system by covering the opening. It is further desirable that a structural part disposed in the space is a lens protecting drive means for driving the lens protecting means.

It is still further desirable that the camera has a focus adjusting means for adjusting the focus of the image sensing element. It is further desirable that a structural part disposed in the space is a focus adjusting drive means for driving the focus adjusting means.

It is desirable that a structural part is a finder for directing object light of a range corresponding to the photographic range from the front surface of the body to the back surface.

In this structure, it is desirable that the finder has an inclined surface for refracting light entering from the front surface of the body, and the finder inclined surface is arranged opposite the previously mentioned inclined surface in the space.

It is desirable that the camera is provided with a photographic zoom optical system in the photographic optical system, a photographic zoom drive means for driving the photographic zoom optical system, a finder zoom optical system in the finder, and a drive transmission means for transmitting the drive force of the photographic zoom drive means to the finder zoom optical system so as to move the finder zoom optical system in conjunction with the movement of the photographic zoom optical system.

It is desirable that the body has the opening at the top right of the front surface, and within the body the photographic optical system is arranged along the right side of the body so as to form a space in the top right posterior part of the body, the image sensing element is arranged facing upward below the photographic optical system, and these structural parts are parts related to the photographic optical system.

In this structure, parts related to the photographic optical system include parts for driving the photographic optical system, and parts for protecting the photographic optical system. Specific examples include a drive system for focus adjustment and zooming, and a barrier drive system for protecting the lens provided at the entrance of the photographic optical system.

The present invention further provides a digital camera having the structure described below.

A digital camera provided with a body having an opening for object light to enter, a photographic optical system having an inclined surface for refracting object light entering from the opening to form an image of the object light, and an image sensing element arranged facing upward below the photographic optical system for sensing an object image formed by the photographic optical system, wherein the photographic optical system is arranged within the body along the right side surface of the body so as to form a space on the side opposite the inclined surface relative to the object light entering from the opening, and part of the structural parts of the digital camera related to the photographic optical system are arranged in the space.

According to this structure, since the structural parts of the digital camera related to the photographic optical system are arranged in the space formed at the back side of the inclined surface adjacent to the photographic optical system, mechanical structures and wiring can be efficiently laid out, and dead space can be used efficiently to make a camera of compact form.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The embodiments of the digital camera of the present invention are described hereinafter with reference to the accompanying drawings.

The general structure of the digital camera using a photographic optical system (refractive optical system) provided with a means for refracting an optical axis is described below using FIGS. 1~4.

Figure 1:
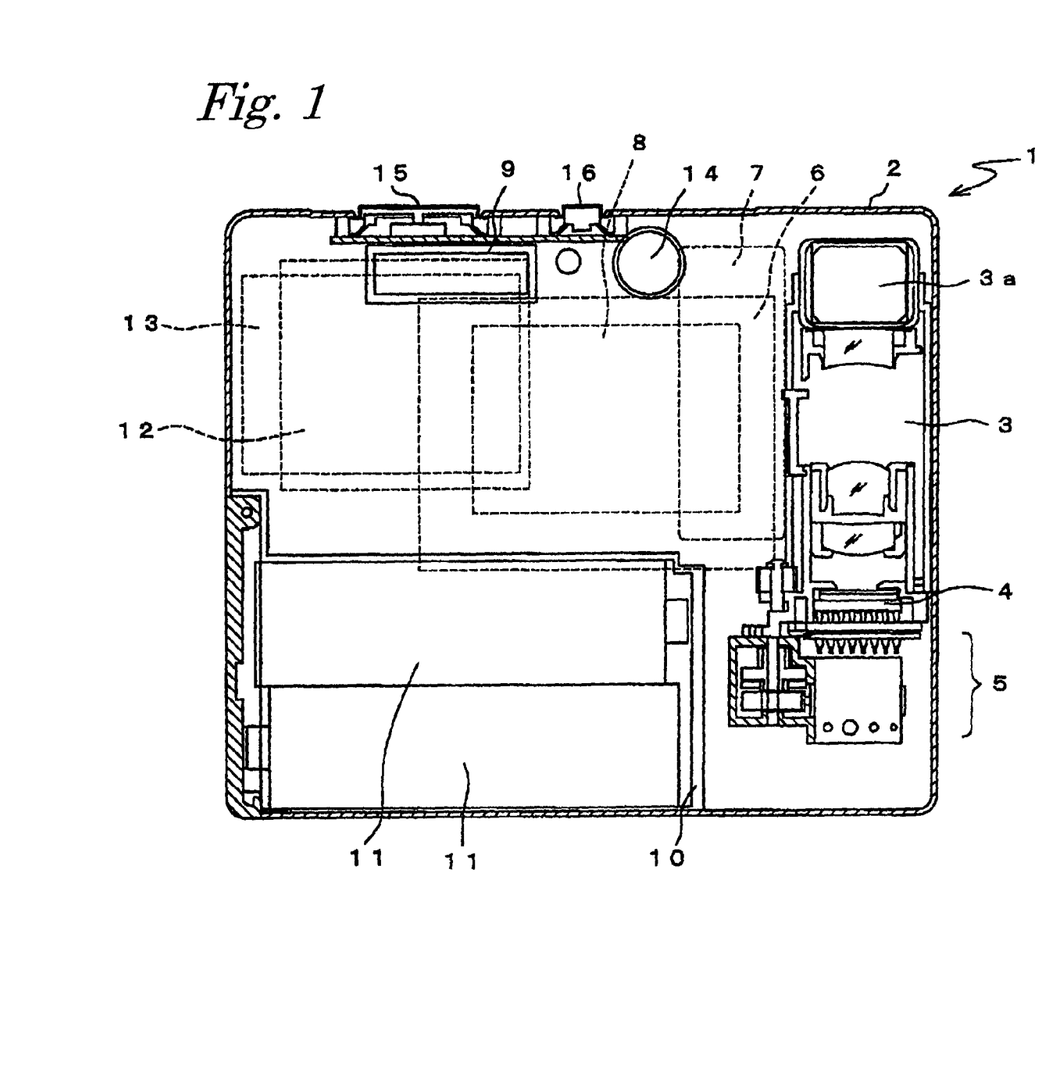
FIG. 1 is a front section view of a digital camera using a refractive optical system.

A digital camera 1 houses a refractive optical system 3 comprising a photographic lens group and barrel along the right side surface of a body 2 viewed from the front, i.e., from the surface facing the object during photography, as shown in the front section view of FIG. 1.

The body of the digital camera 1 is a body 2 having a flat shape wherein the thickness dimension is small compared to the height and width dimensions, as shown in FIGS. 1~4. The body has an opening 3a used by the refractive optical system 3 on the top right part of the front side as shown in FIG. 1. A finder 14 and flash 9 are provided on the left side of the opening 3a.

Figure 2:
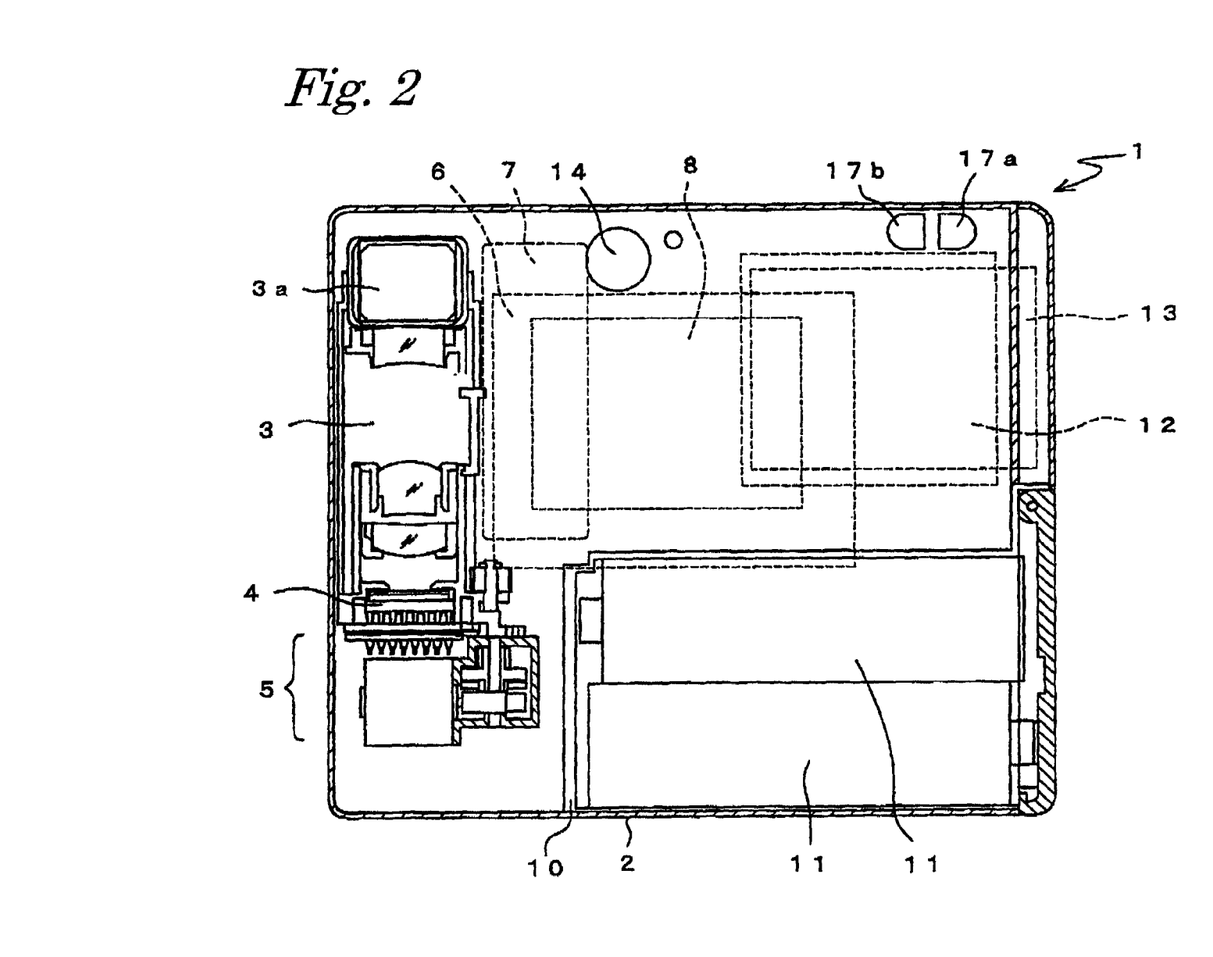
FIG. 2 is a back section view of a digital camera using a refractive optical system.
Figure 3:
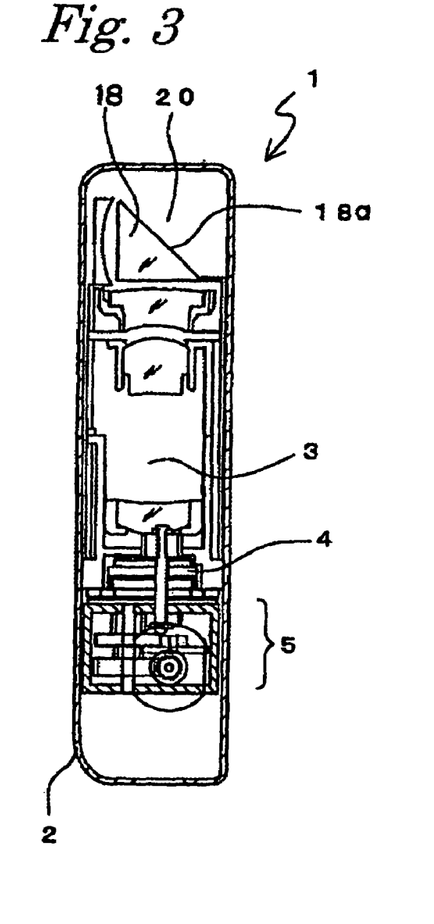
FIG. 3 is a right side section view of a digital camera using a refractive optical system.

As shown in the back section view of FIG. 2, a liquid crystal display 6 for displaying images is arranged at the back wall of the body 2 so as to expose a display screen 8 on the back wall of the body 2. Furthermore, zoom buttons 17a and 17b are provided for adjusting the zoom of the refractive optical system. The zoom buttons 17a and 17b comprise a telephoto button 17a and a wide angle button 17b, and when either button is pressed, a zoom drive system 5 is actuated to move the zoom lens.

Figure 4:
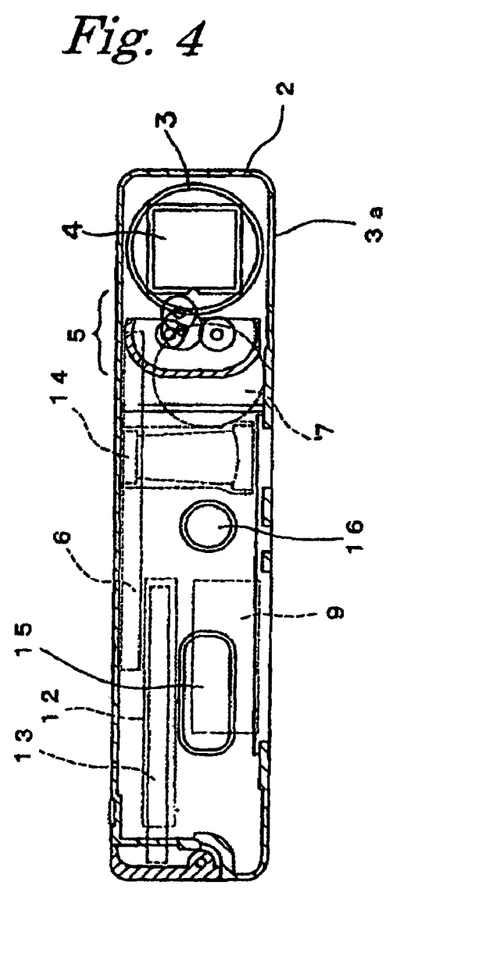
FIG. 4 is a top section view of a digital camera using a refractive optical system.

As shown in FIG. 1 and the top section view of FIG. 4, a release button 15 for photographic operation and a main switch 16 for switching photographic modes are provided on the top wall of the body 2.

Object light enters the refractive optical system 3 from the opening 3a. The refractive optical system 3 is provided perpendicular to the right end of the body 2 as previously described. Light entering perpendicular to the front surface of the body is refracted downward by a prism 18. For this reason the prism 18 is provided with an inclined surface 18a inclined at a specific angle relative to the entrance direction of the object light. As shown in the right side section view of FIG. 3, a space 20 in a region circumscribed by the body 2 is formed at the back side of the inclined surface 18a of the prism 18, i.e., on the side opposite the opening 3a. Structural parts of the digital camera are arranged in this space 20 in each embodiment of the present invention.

A zoom drive system 5 for driving the zoom lens is provided below the image sensing element 4. By means of such placement the space formed below the refractive optical system 3 and the image sensing element 4 can be used effectively.

A battery compartment 10 is provided at the left side of the refractive optical system 3 and the image sensing element 4. The battery compartment 10 houses batteries 11, is arranged perpendicular to the refractive optical system 3, in the thickness direction of the body so that the length direction is horizontal to the bottom wall of the body 12.

A memory slot 12 for inserting a memory card 13 and a base plate (not shown) overlaid in the thickness direction are provided on the front side of the liquid crystal display. These parts are thin parts, and can be arranged one upon another in the thickness direction of the body so as to be smaller than the thickness of the refractive optical system 3.

A main condenser 7 of the flash 9 is provided between the memory slot 12 and the refractive optical system 3. The main condenser 7 is overlaid on the liquid crystal display 6 in the thickness direction.

A first embodiment of the digital camera of the present invention is described below with reference to FIGS. 5~8.

The digital camera of the first embodiment has a barrier for protecting the entrance of the refractive optical system by covering the opening 3a of the body, and a mechanism for driving this barrier is arranged in the space 20 circumscribed by the wall of the body 2 and the inclined surface of the prism 18.

Figure 5:
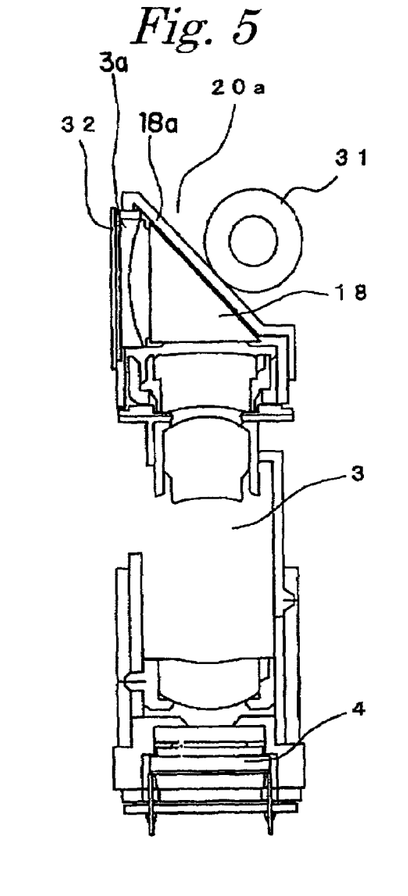
FIG. 5 is a right side section view showing the layout of the refractive optical system of a first embodiment of the digital camera of the present invention.
Figure 6:
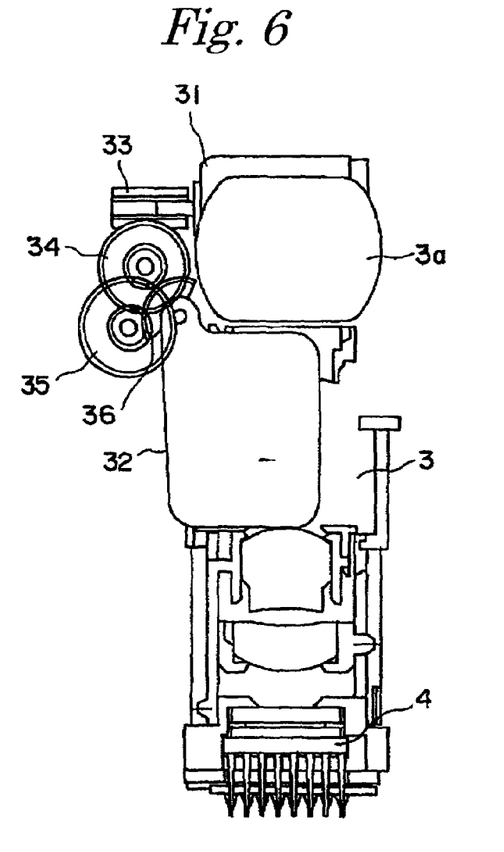
FIG. 6 is a front section view showing the layout of the refractive optical system of a first embodiment of the digital camera of the present invention.
Figure 7:
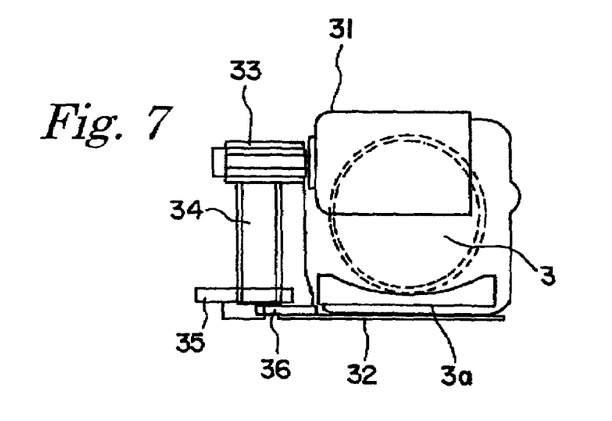
FIG. 7 is a top section view showing the layout of the refractive optical system of a first embodiment of the digital camera of the present invention.

In the present embodiment, a barrier drive motor 31 is provided in the space 20a formed on the side opposite the inclined surface 18a of the prism 18 for refracting the optical axis of the object light, as shown in the right side section view of FIG. 5. A barrier 32 is supported so as to be rotatable near the opening 3a, as shown in the front section view of FIG. 6. A fourth gear 36 for transmitting the drive force of the barrier drive motor 31 is provided near the pivot axis of the barrier.

Figure 8:
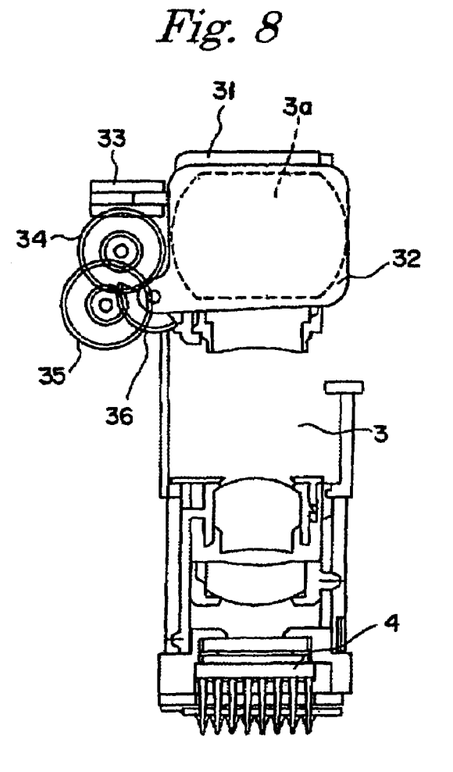
FIG. 8 illustrates the refractive optical system protected by a barrier covering the opening shown in FIG. 5.
Figure 9:
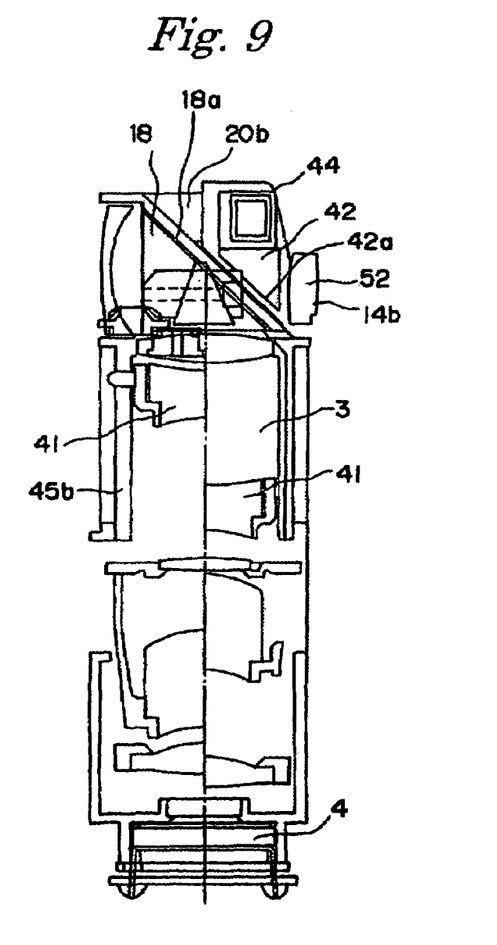
FIG. 9 is a right side view showing the layout of the optical system of a digital camera of a second embodiment of the present invention.
Figure 10:
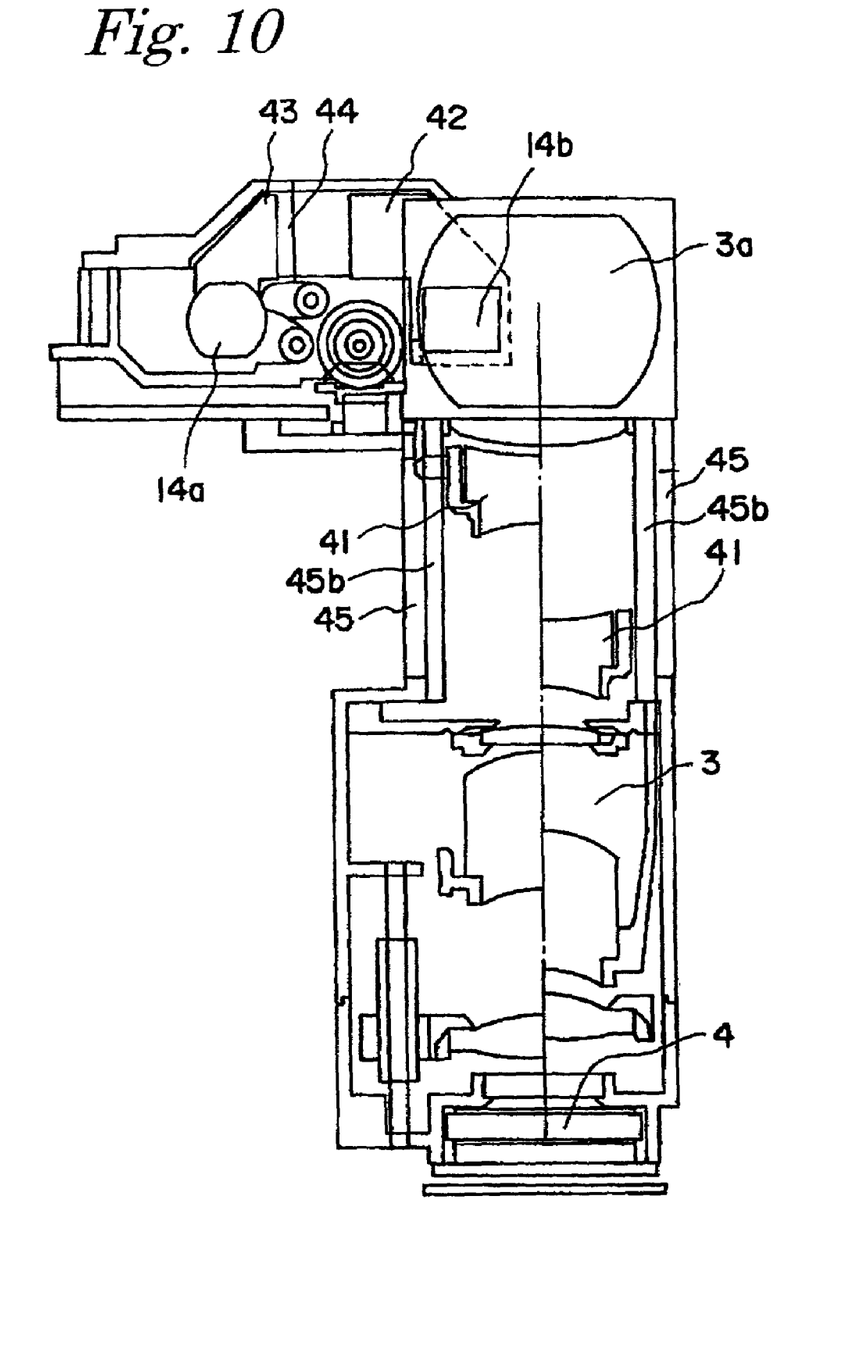
FIG. 10 is a front section view showing the layout of the refractive optical system of the digital camera of the second embodiment of the invention.
Figure 11:
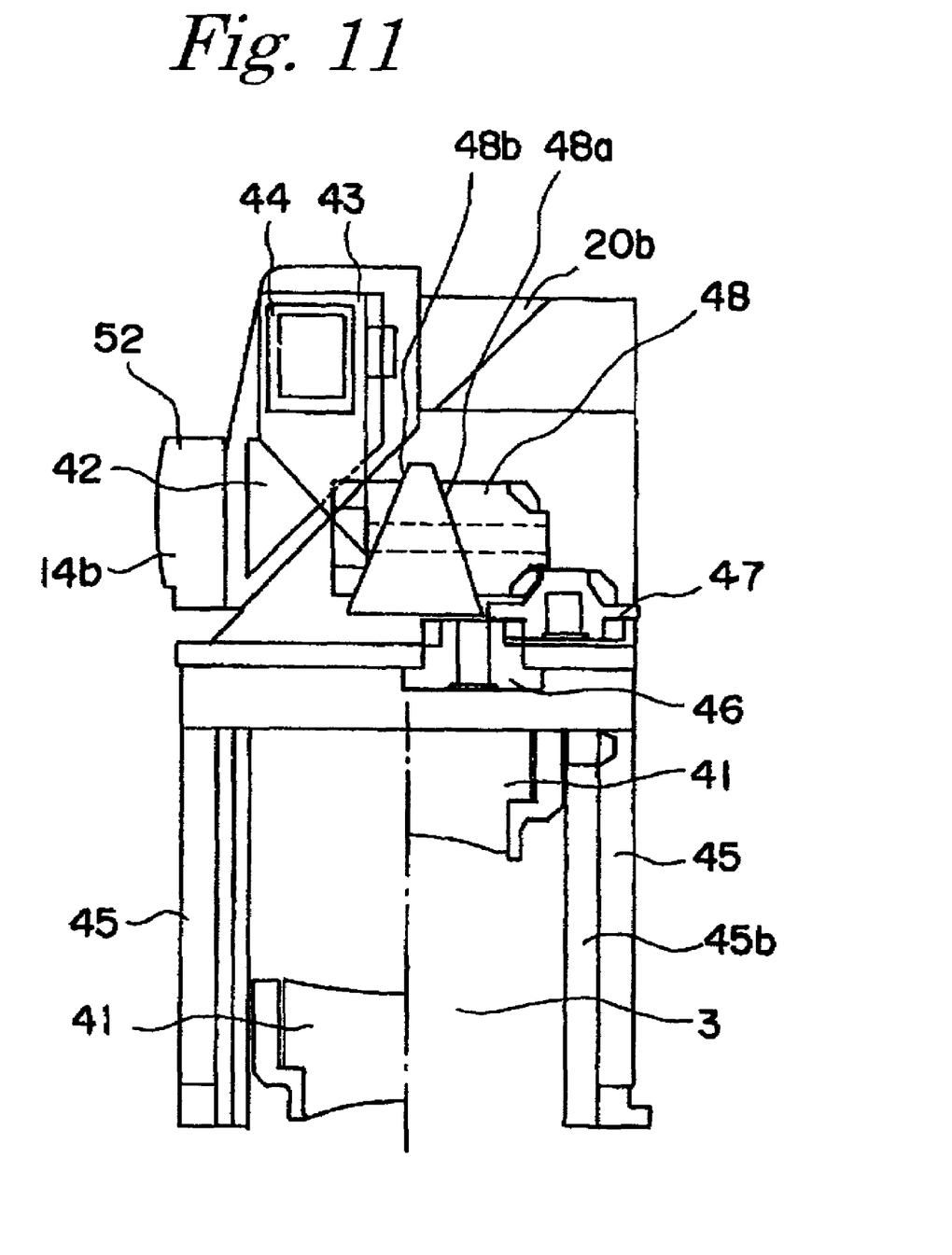
FIG. 11 is an enlarged left side section view of the essential part showing the layout of the refractive optical system of the digital camera of the second embodiment of the invention.
Figure 12:
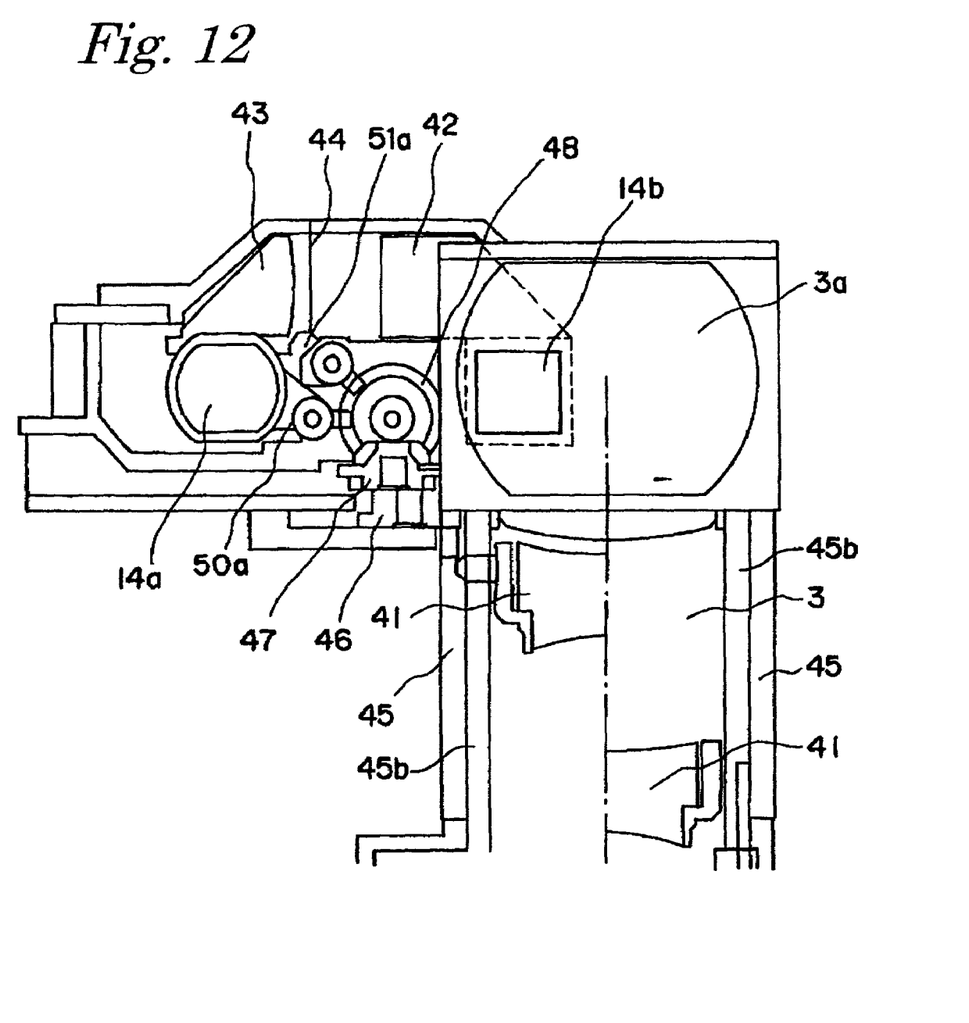
FIG. 12 is an enlarged front section view of the essential part showing the layout of the refractive optical system of the digital camera of the second embodiment of the invention.
Figure 13:
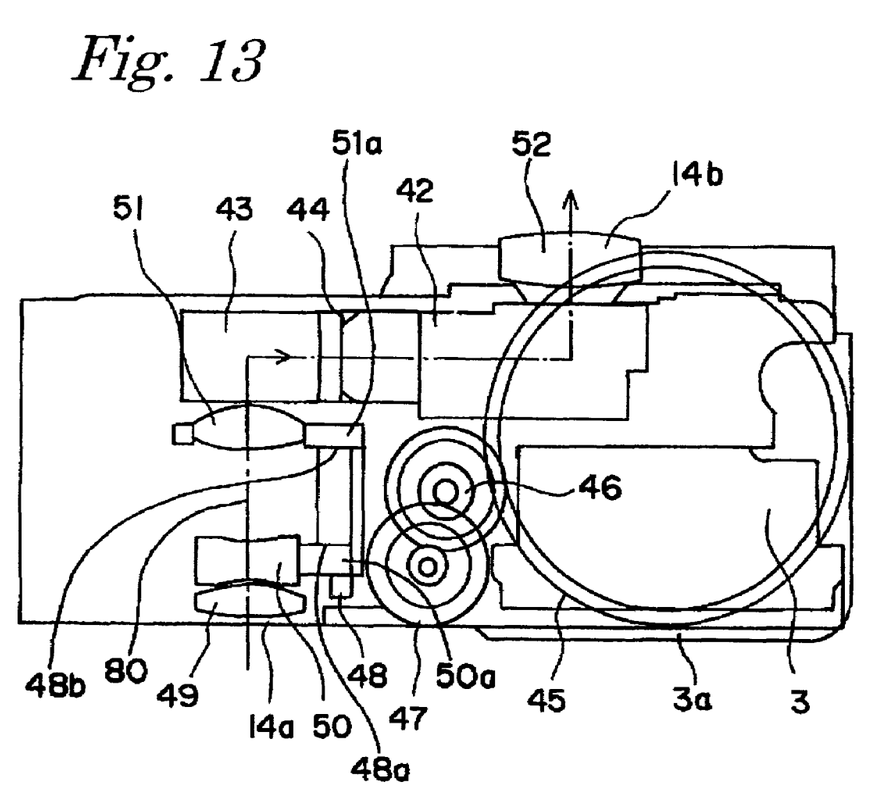
FIG. 13 is an enlarged top section view of the essential part showing the layout of the refractive optical system of the digital camera of the second embodiment of the invention.

The barrier drive motor 31 is actuated by specific operation of the digital camera. The drive of the motor 31 is transferred to a first gear 33, then to a second gear 34, and a third gear 35. The third gear 35 drives a fourth gear 36 mounted on the barrier 32, whereby the barrier 32 is driven in a specific direction. FIG. 8 shows the barrier 32 covering the opening 3a.

Since the motor for driving the barrier is provided near the refractive optical system, the structure of the mechanism for driving the barrier can be simple, and since the space 20a which is dead space at that specific location, the camera can be made compact.

The digital camera of a second embodiment of the present invention is described below with reference to FIGS. 9~13.

The digital camera of the second embodiment has a finder 14 arranged in a space 20b formed on the side opposite the inclined surface 18a of the prism 18 of the refractive optical system 3. The finder refracts light entering from a finder entrance 14a provided on the front surface of the body via two prisms 42 and 43, and directs the light to a finder exit 14b provided on the back surface of the body, as shown in the enlarged top view of the essential part of FIG. 13. An inclined surface 42a of the prism 42 and an inclined surface 18a of the prism 18 of the refractive optical system are both constructed to bend the respective optical axes (i.e., finder optical axis and photographic optical system optical axis) 90°, and both can be closely arranged within the space 20b by arranging the inclined surfaces in opposition, as shown in the right side view of FIG. 9.

The finder has three lenses 49, 50, 51, and lens 49 is stationary. On the other hand, lenses 50 and 51 are mounted so as to be movable during operation in the direction of the optical axis 80 for finder zooming. Light entering from the entrance 14a passes through the lenses 49, 50, 51 along the optical axis 80, and arrives at the prism 43, as shown in the enlarged front view of the essential part of FIGS. 12 and 13. The prism 43 bends the image upward, at a right angle to the optical axis, and directs the image to the image surface 44. An eyepiece lens 52 for viewing an enlargement of the image formed on the image surface 44 bends the optical path in a downward direction and optical axis direction so as to make the image surface viewable as an erect image via the prism 42.

The finder zoom system is constructed to drive in conjunction with the zooming of the refractive optical system 3. The zoom mechanism of the refractive optical system 3 drives the extension and retraction of the zoom lens 41 guided by the rectilinear barrel 45b via rotation of a drive cam barrel 45, as shown in the enlarged left side section view of the essential part of FIG. 11 and FIG. 12. The drive mechanism of the finder zoom system transfers the rotational movement of the drive cam barrel 45 of the refractive optical system 3 to a cam ring 48 via the gears 46 and 47, and changes the distance between the cam surfaces 48a and 48b abutting the frames 50a and 51a of the lenses 50 and 51 via the rotation of the cam ring 48, thereby changing the respective distances of the two lenses 50 and 51.

By using this structure for the finder zoom drive mechanism, the rotational movement of the drive cam barrel 45 can be transferred to the cam ring 48 and the two lenses 50 and 51 of the finder to change the corresponding finder image in accordance with the degree of zoom by the refractive optical system 3.

Figure 15:
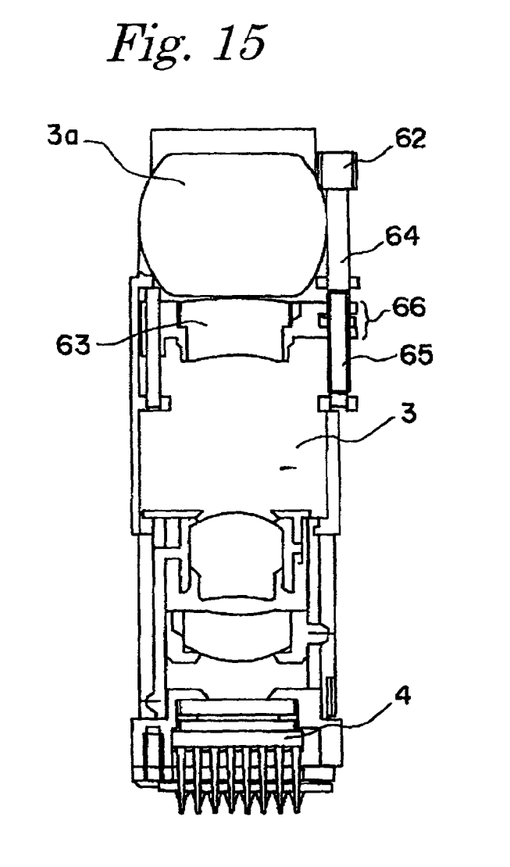
FIG. 15 is a front view showing the layout of the optical system of the digital camera of a third embodiment of the invention.
Figure 16:
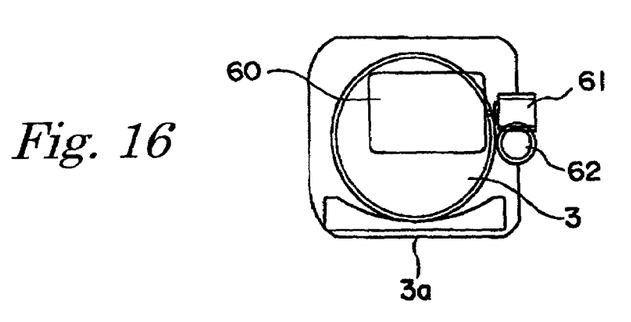
FIG. 16 is a top view showing the layout of the optical system of the digital camera of a third embodiment of the invention.

The digital camera of a third embodiment of the present invention is described below with reference to FIGS. 14~16.

Figure 14:
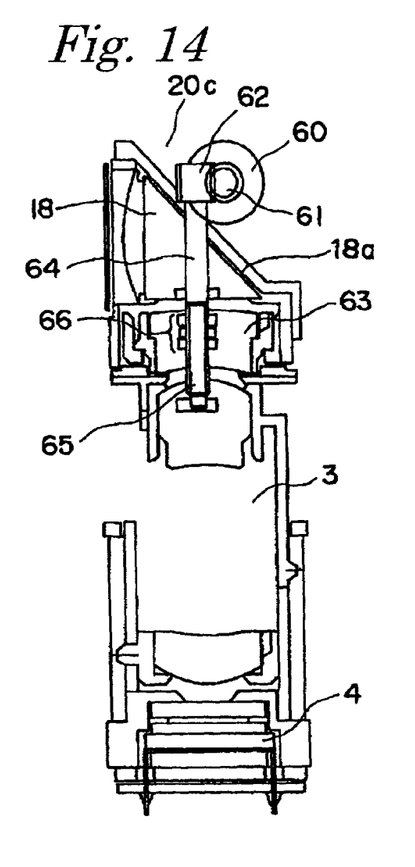
FIG. 14 is a right side view showing the layout of the optical system of the digital camera of a third embodiment of the invention.

The digital camera of the third embodiment arranges a focus adjusting drive mechanism for driving a focusing lens 63 to adjust the focus on an image sensing element 4 in a space 20c formed on the side opposite the inclined surface 18a of the prism 18 of the refractive optical system, as shown in the right side view of FIG. 14. The focus adjusting mechanism comprises a focus adjusting motor 60, first gear 61 mounted on the motor shaft, second gear 62 for inflecting the angle of movement of the first gear 61 by 90° and transmitting the movement of the first gear 61 to a shaft 64, and a shaft 64 having a spiral screw part 65 on its tip. The focus adjusting motor 60 is arranged adjacent to the back surface of the inclined surface 18a of the prism 18. The shaft 64 is arranged laterally to the refractive optical system 3 so as to not be perpendicular to the thickness direction of the digital camera, as shown in the front view of FIG. 15. By means of this arrangement the parts requiring relative length are not arranged in the thickness direction of the camera, thereby reducing the influence of such parts on the thickness of the camera.

The focus adjusting motor 60 is driven when an electrical signal is received, and drives the first gear. The first gear is fixedly mounted on the shaft, and the rotation of first gear is transferred to the shaft 64. The tip of the shaft 64 is provided with a screw part 65, and this screw part 65 engages a female screw part 66 mounted on a focusing lens 63. The rotation of the shaft changes the position of the focusing lens 63 in the height direction to adjust the focus.

Arranging the focus adjusting motor 60 in the space 20c in this way realizes a compact mechanism for driving the focusing lens 63 via a simple structure. Furthermore, since the space 20c is dead space, the camera can be made more compact.

As described above, the camera of the present invention houses structural parts of the camera in a space provided at the side opposite an inclined surface of the refractive optical system, so as to realize efficient placement of structural parts. Furthermore, the structure of the drive mechanisms and wiring layout can be simplified by having structural parts in the space parts which are related to the refractive optical system, thereby simplifying the camera structure and making the camera more compact.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A camera comprising:
   a body having a front surface which includes an opening for object light to enter and a back surface;
   an optical system including a first optical element having a first inclined surface for folding an axis of object light entering from the opening; and
   an optical finder including a second optical element having a second inclined surface for folding an axis of light entering from a finder entrance provided on the front surface of the body, the first inclined surface of the first optical element and the second inclined surface of the second optical element being arranged in opposition so that both surfaces are closely arranged within space formed between the back surface of the body and the first inclined surface of the first optical element in the optical system.

2. A camera according to claim 1, further comprising: an image sensor which receives the object light refracted by the first inclined surface.

3. A camera according to claim 1, further comprising: a member arranged adjacent to the first inclined surface.

4. A camera according to claim 1, wherein the back surface is arranged adjacent to an edge of the first inclined surface.

5. A camera according to claim 1, further comprising:
   a cover movable between a first position wherein the optical system is covered at the opening of the body by the cover and a second position wherein the optical system is uncovered at the opening of the body; and
   a member disposed in the space and constituting a part of a driving unit which moves the cover.

6. A camera according to claim 1, further comprising:
   a focus adjusting device which moves a optical member of the optical system to adjust a focus position of the optical system; and
   a member disposed in the space and constituting a part of the focus adjusting device.

7. A camera according to claim 1, further comprising: a finder which directs object light from the front surface to the back surface of the body; and
   a member disposed in the space and constituting a part of the finder.

8. A camera according to claim 1, further comprising:
   a zoom finder which directs object light from the front surface to the back surface of the body and includes a finder zoom system, wherein the optical system includes a main zoom system; and
   a member disposed in the space and constituting a part of drive transmission unit which transmits a drive force between the main zoom system and the finder zoom system.

9. A camera according to claim 1, wherein the body has the opening at a top right of the front surface and the optical system is arranged along a right side of the body.

10. A camera according to claim 9, further comprising: an image sensing element arranged facing upward below the optical system.

11. A camera comprising:
    a body having an opening for object light to enter;
    an image taking optical system including a first optical element having a first inclined surface for folding an axis of object light entering from the opening to form an imago of the object light; and
    an image sensing element arranged so as to receive the light folded by the first optical element of the image taking optical system and which images an object image formed by the image taking optical system,
    wherein the image taking optical system is arranged within the body a right side surface of the body so as to form a space on a side of the first inclined surface of the first optical element opposite a side of the first inclined surface relative to the object light entering from the opening; and
    an optical finder including a second optical element having a second inclined surface for folding an axis of light entering from a finder entrance provided on the front surface of the body, the first inclined surface of the first optical element and the second inclined surface of the second optical element being arranged in opposition so that both surfaces are closely arranged within the space.

* * * * *